Oct. 9, 1956  W. C. YOUNGCLAUS  2,765,650
DEVICE FOR TURNING AN AIRPLANE
Filed Oct. 20, 1953  2 Sheets-Sheet 1

INVENTOR
WARREN C. YOUNGCLAUS
BY *Louis Burgess*
ATTORNEY

Oct. 9, 1956     W. C. YOUNGCLAUS     2,765,650
DEVICE FOR TURNING AN AIRPLANE
Filed Oct. 20, 1953                  2 Sheets-Sheet 2
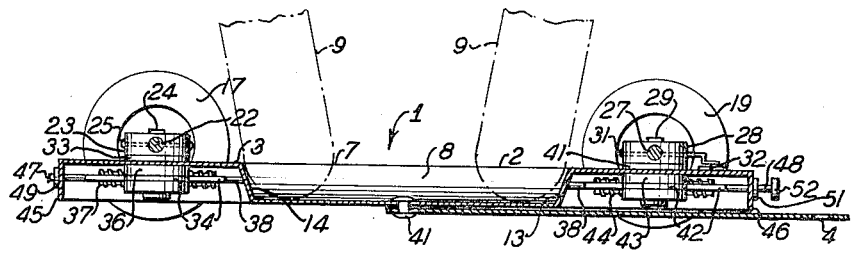
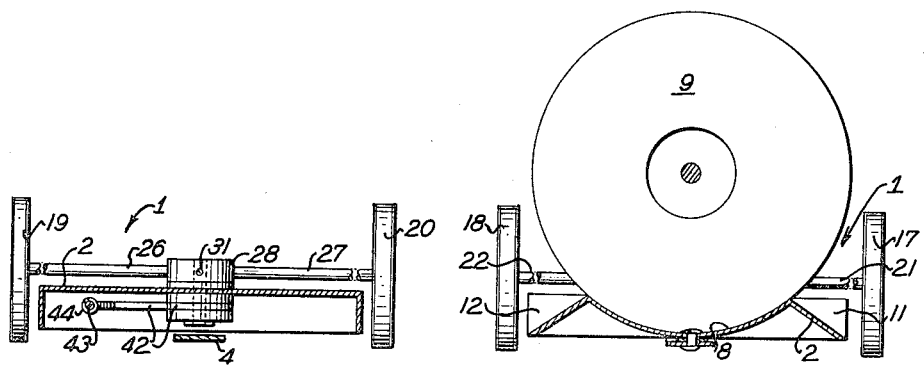
INVENTOR
WARREN C. YOUNGCLAUS
BY Louis Burgess
ATTORNEY

United States Patent Office 2,765,650
Patented Oct. 9, 1956

2,765,650

DEVICE FOR TURNING AN AIRPLANE

Warren C. Youngclaus, Garden City, N. Y.

Application October 20, 1953, Serial No. 387,267

4 Claims. (Cl. 73—1)

This invention is a new and useful device for turning an airplane, when on the ground, radially about a point midway between the landing wheels. The invention will be fully understood from the following description read in conjunction with the drawings in which:

Fig. 3 is a plan view, with parts omitted to facilitate inspection;

Fig. 4 is a section through the showing in Fig. 1 on the plane indicated by 4—4; and Fig. 5 is a section through the showing in Fig. 1 on the plane indicated by 5—5.

Figure 1:
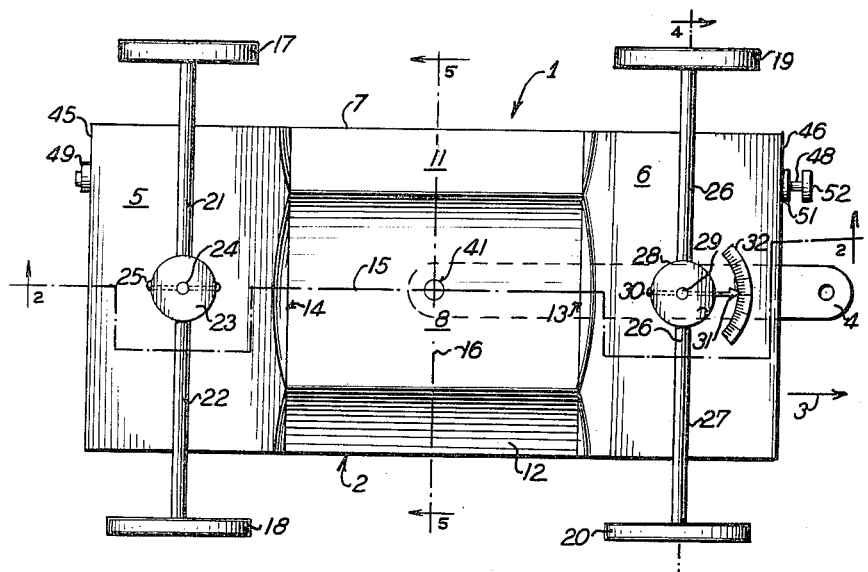
Fig. 1 is a plan view of the device.

In my copending application, Serial No. 323,691 I have described and claimed a new and useful method and device for determining the deviation of magnetic compasses installed in aircraft. The method and device are especially suited for use at temporary bases, fields where no hard surface is available and, in general, at locations where it has not been possible to establish a compass rose for calibration purposes. Even where a compass rose is available, the said method and device make it possible to calibrate an airplane compass with much greater accuracy than is possible by the use of a compass rose.

Briefly, the said method consists in selecting a location at which the deviation is zero, i. e., which is free from subsurface or adjacent iron structures such as pipes, tanks, etc., followed by placing a magnetic compass at this location. By means of this compass, and while the deviation is maintained at zero, an azimuth ring is oriented to true magnetic by the reading of this compass. To this end the azimuth ring is turned until its zero graduation coincides with magnetic north as indicated by the compass. The azimuth ring is then locked in position, indicating true magnetic directions. The airplane is then moved into position with a point on the body of the plane midway between the landing wheels, exactly over the azimuth ring. A flexible connection is then made from the underbody of the airplane to a ring which is concentric with and freely turnable with respect to the azimuth ring. This turnable ring carries a lubber line which, because of the flexible connection, is at all times coincident with the longitudinal axis of the plane and therefore indicates the heading of the airplane; the magnetic heading of the airplane in any position is indicated by that graduation of the azimuth ring which registers with the lubber line. The deviation of the airplane for such position is the difference, east or west as the case may be, between the heading so indicated and the heading simultaneously indicated by the magnetic compass of the airplane.

To complete the calibration it is necessary to repeat the operation for a number of headings, usually about 15° apart. In so doing, in order to maintain absolute registry at all times between the lubber line and the longitudinal axis of the ship, it is important that the point on the underbody of the plane midway between the landing wheels be held exactly over the azimuth ring. This may be accomplished by manipulating the brakes of the airplane while the plane is turned, either by means of its propellers or by means of a tractor, but it is difficult to obtain a precise adjustment by such means. I have now invented a device by which the airplane may be turned radially almost exactly about the point midway between the landing wheels.

As shown in the figures device 1 includes platform 2, which may be pulled in the direction indicated by arrow 3, by means of tow bar 4 pivotally connected to platform 2 at its midpoint 41. Ends 5 and 6 of platform 2 are flat, while the central portion 7 defines recess 8 adapted to snugly engage the tread of double wheel nose wheel 9. The central recess 8 is bounded by portions 11 and 12 which slope outwardly and downwardly, forming ramps by which the nose wheel 9 may be rolled gently in position in the recess 8.

Figure 2:
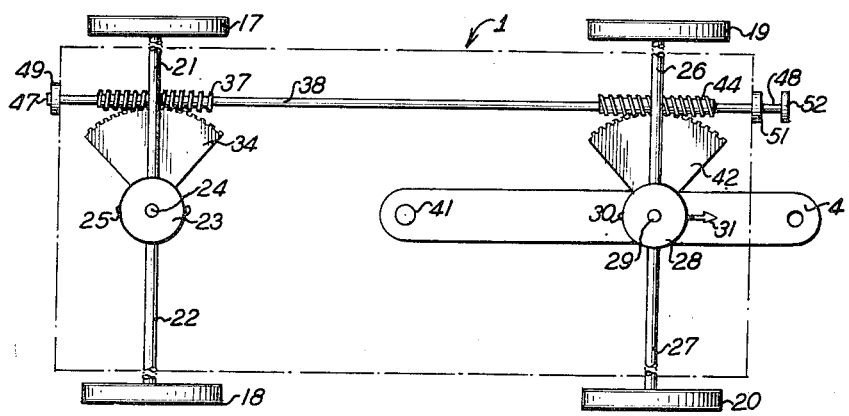
Fig. 2 is a view through the construction shown in Fig. 1 on the plane indicated by 2—2.

In Fig. 2 I have indicated wheels 9 of a plane having double nose wheel, the outer sides of which snugly engage (Fig. 2) the ends 13 and 14 of recess 8. The device is equally adapted to use with airplanes having single nose wheels, in which case the recess 8 may be made shorter or may, if desired, be provided with adjustable means for securing the wheel in the recess.

Platform 2 (Fig. 1) has longitudinal axis 15 and transverse axis 16. Rolling wheels 17 and 18 are mounted adjacent one end of longitudinal axis 15 and rolling wheels 19 and 20 are mounted adjacent the other end. Rolling wheels 17 and 18 are mounted respectively on axles 21 and 22 which are socketed in disc 23. Disc 23 is immobilized with respect to vertical shaft 24 by means of pin 25. Rolling wheels 19 and 20 are mounted respectively on axles 26 and 27, which are socketed in disc 28. Disc 28 is immobilized with respect to shaft 29 by means of pin 30. The forward end of pin 30 carries pointer 31 and this, in combination with scale 32, at the top of end 6 gives an exact indication of the angular divergence of the plane of wheels 19 and 20 with respect to longitudinal axis 15. Disc 23 (Fig. 2) is spaced apart from the top surface of end 5 by means of disc 33. Vertical shaft 24 is secured (Fig. 3) to worm quadrant 34. Quadrant 34 bears (Fig. 2) against thrust bearing 36 carried by the bottom surface of end 5. Quadrant 34 is actuated (Fig. 3) by worm 37 carried by longitudinal shaft 38. Adjacent the other end of longitudinal axis 15, the disc 28 which carries axles 26 and 27, is spaced apart from the top surface of end 6 by disc 41. The lower end of vertical shaft 29 is secured (Figs. 2 and 3) to worm quadrant 42. Worm quadrant 42 is actuated by worm 44 carried by shaft 38. The ends of platform 2 are turned over (Fig. 2) to form extensions 45 and 46. The ends 47 and 48 of shaft 38 are mounted in bearings 49 and 51 carried by these extensions. Shaft 38 is turned by means of hand wheel 52 (Figs. 2 and 3). Worm quadrant 42 and the companion worm 44 carry a right-handed thread whereas worm quadrant 34 and the companion worm 37 carry a left-handed thread. For this reason, as shaft 38 is turned by means of hand wheel 52, the angle divergence between transverse axis 15 and the plane of wheels 17 and 18 is equal and opposite to the angular divergence between transverse axis 15 and the plane of wheels 19 and 20.

While I have described the preferred form of device in which both sets of wheels are adjustable with respect to the longitudinal axis 15 of platform 2, the device is useable, although with somewhat lesser accuracy, if only one set of wheels, preferably the set adjacent the free end of tow bar 4, is so adjustable.

In the use of the device shown and claimed in the instant application, a location is first selected in which the magnetic deviation is zero. The device described and claimed in my copending application, Serial No. 323,691, is then positioned in this location. By means of the compass needle, which is an element of this device, the azimuth ring is pre-set to indicate true magnetic directions and locked in position. The device shown and claimed in the instant application is then positioned within this area, with the transverse axis 16 pointed directly at the center of the azimuth ring, and with the distance between the azimuth ring and the center of the recess 8 directly equal to the longitudinal distance between the point midway between the landing wheels of the airplane and the center of the nose wheel assembly. The airplane is then moved into position with that point on the underbody of the plane midway between the landing wheels exactly over the azimuth ring, whereupon the nose wheel assembly will move directly in position in which it is snugly engaged by recess 8. The flexible connection is then completed between the underbody of the plane and the movable ring of the device described in application, Serial No. 323,691, which carries the lubber line. By means of hand wheel 52 the axles which carry the set of wheels 18 and 19, and the axles which carry the set of wheels 19 and 20, are then adjusted so that they are exactly radial with respect to the center of the azimuth ring. After the first determination of deviation is completed in this position by reading and recording the magnetic heading of the plane from the azimuth ring and the compass heading from the ship's compass, and with the brakes of the airplane fully released, platform 2 is moved by exerting traction on the free end of tow bar 4 through an angle measured on the radius between the centre of platform 2 and the azimuth ring equal to approximately 15°. In this location a second determination of deviation is made, whereupon the operation is again repeated until the full 360° of arc have been completed. At each such heading the exact magnetic heading shown by reference of the lubber line to the azimuth ring and the heading indicated by the magnetic compass of the plane, are read and recorded. The data so obtained should be sufficient for the preparation of a complete deviation chart or card. If greater accuracy is required, a larger number of determinations over the full 360° of arc can, of course, be made without difficulty. Throughout the entire turning movement, the movement of the airplane is so controlled by the device herein described and claimed that the airplane describes a perfect circle radially about a point midway between the landing wheels. The device can, of course, be used with equal advantage in determining deviation by the method of the prior art, wherein a compass rose is used to indicate headings, or in any other case in which it is necessary to turn an airplane radially precisely about a point midway between the landing wheels.

I claim:

1. Means for turning an airplane equipped with landing wheels and a nose wheel and not in flight, radially, about a point midway between said landing wheels, said means comprising a platform having a longitudinal and transverse axis, at least one steerable wheel adjacent one end of said longitudinal axis, at least one wheel adjacent the other end of said longitudinal axis, a manually controllable means for setting the angle of said steerable wheel with respect to said longitudinal axis, said platform defining a recess adapted to snugly engage and hold said nose wheel in position parallel to the said transverse axis of said platform, an inclined ramp leading upwardly to said recess and means indicating the exact angular deviation of said steerable wheel with respect to said longitudinal axis of said platform.

2. Means for turning an airplane equipped with landing wheels and a nose wheel and not in flight, radially, about a point midway between said landing wheels, said means comprising a platform having a longitudinal and transverse axis, a pair of steerable wheels adjacent one end of said longitudinal axis, at least one wheel adjacent the other end of said longitudinal axis, manually controllable means for setting the angle of said steerable wheels with respect to said longitudinal axis, said platform defining a recess adapted to snugly engage and hold said nose wheel in position parallel to said transverse axis of said platform, an inclined ramp leading upwardly to said recess and means indicating the exact angular deviation of said steerable wheels with respect to said longitudinal axis.

3. Means for turning an airplane equipped with landing wheels and a nose wheel and not in flight, radially, about a point midway between said landing wheels, said means comprising a platform having a longitudinal and transverse axis, at least one steerable wheel adjacent one end of said longitudinal axis, at least one steerable wheel adjacent the other end of said longitudinal axis, manually controllable means for setting the angle of each of said steerable wheels with respect to said longitudinal axis, said platform defining a recess adapted to snugly engage and hold said nose wheel in position parallel to said transverse axis, an inclined ramp leading upwardly to said recess and means indicating the exact angular deviation of each of said steerable wheels with respect to said longitudinal axis.

4. Means for turning an airplane equipped with landing wheels and a nose wheel and not in flight, radially, about a point midway between said landing wheels, said means comprising a platform having a longitudinal and transverse axis, at least one steerable wheel adjacent one end of said longitudinal axis, at least one steerable wheel adjacent the other end of said longitudinal axis, manually controllable means for simultaneously varying in opposite angular directions the angle of each of said steerable wheels with respect to said longitudinal axis, said platform defining a recess adapted to snugly engage and hold said nose wheel in position parallel to said transverse axis, an inclined ramp leading upwardly to said recess and means indicating the exact angular deviation of at least one of said steerable wheels with respect to said longitudinal axis.

References Cited in the file of this patent

UNITED STATES PATENTS

| | | |
|---|---|---|
| 1,108,507 | Mack | Aug. 25, 1914 |
| 1,303,476 | Harshman | May 13, 1919 |
| 1,394,489 | Funkhouser et al. | Oct. 18, 1921 |
| 2,282,189 | Jackson | May 5, 1942 |
| 2,463,744 | Clemens | Mar. 8, 1949 |
| 2,473,519 | Gillitzer | June 21, 1949 |
| 2,509,116 | Wakefield | May 23, 1950 |